(12) United States Patent
Chen et al.

(10) Patent No.: US 8,116,971 B2
(45) Date of Patent: Feb. 14, 2012

(54) TRAINING A DRIVER OF A VEHICLE TO ACHIEVE IMPROVED FUEL ECONOMY

(75) Inventors: Wei Tzu Chen, Redmond, WA (US); Joseph Figueroa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 12/147,204

(22) Filed: Jun. 26, 2008

(65) Prior Publication Data

US 2009/0326753 A1    Dec. 31, 2009

(51) Int. Cl.
*G09B 19/16* (2006.01)
(52) U.S. Cl. ............ 701/123; 701/29; 701/110; 701/70; 340/439; 434/66; 73/114.53
(58) Field of Classification Search .................. 701/123, 701/1, 99, 101, 102, 29, 33, 35, 110, 70, 701/93; 340/439; 434/29, 62, 65, 66; 73/114.52, 73/114.53
See application file for complete search history.

(56) References Cited

U.S. PATENT DOCUMENTS

| | | | | |
|---|---|---|---|---|
| 4,677,556 | A * | 6/1987 | Habu | 701/64 |
| 4,731,727 | A * | 3/1988 | Rauch et al. | 701/123 |
| 4,998,594 | A | 3/1991 | Orloski | |
| 5,577,913 | A | 11/1996 | Moncrief et al. | |
| 5,618,179 | A | 4/1997 | Copperman et al. | |
| 6,631,322 | B1 * | 10/2003 | Arthur et al. | 701/211 |
| 6,679,702 | B1 | 1/2004 | Rau | |
| 6,985,804 | B2 * | 1/2006 | Minami | 701/64 |
| 7,043,342 | B1 | 5/2006 | Dewees | |
| 7,454,962 | B2 * | 11/2008 | Nishiyama et al. | 73/114.52 |
| 7,512,477 | B2 * | 3/2009 | Quigley et al. | 701/103 |
| 7,603,228 | B2 * | 10/2009 | Coughlin | 701/123 |
| 7,765,058 | B2 * | 7/2010 | Doering | 701/123 |
| 7,778,769 | B2 * | 8/2010 | Boss et al. | 701/123 |
| 2002/0063639 | A1 | 5/2002 | Matsunaga | |
| 2005/0055157 | A1 * | 3/2005 | Scholl | 701/207 |
| 2005/0091018 | A1 | 4/2005 | Craft | |
| 2005/0096836 | A1 * | 5/2005 | Minami et al. | 701/123 |
| 2006/0070783 | A1 | 4/2006 | Dziak | |
| 2007/0143002 | A1 * | 6/2007 | Crowell et al. | 701/123 |
| 2007/0287133 | A1 | 12/2007 | Schubert et al. | |
| 2008/0294339 | A1 * | 11/2008 | Tauchi et al. | 701/212 |
| 2008/0306706 | A1 * | 12/2008 | Markovic | 702/141 |

FOREIGN PATENT DOCUMENTS

EP    1811481    7/2007

OTHER PUBLICATIONS

Omar et al., "Integrating GPS with Standalone MVEDR", Dec. 6-8, 2004, International Symposium on GNSS/GPS, pp. 15.
"GPS Satellite Signals Help Drivers Save Fuel and Reduce Emissions", Nov. 19, 2001, GPS Daily, retrieved at <<http://www.gpsdaily.com/reports/GPS_Satellite_Signals_Help_Drivers_Save_Fuel_and_Reduce_Emissions.html>>, pp. 4.

* cited by examiner

*Primary Examiner* — Paul N Dickson
*Assistant Examiner* — Keith Frisby
(74) *Attorney, Agent, or Firm* — Alleman Hall McCoy Russell & Tuttle LLP (57) ABSTRACT

A system for training a driver to achieve improved fuel economy monitors the driving parameters of a vehicle, analyzes the monitored driving parameters, calculates suggested driving behavior adjustments, and communicates the driving behavior adjustments to the driver as the driver is driving.

20 Claims, 8 Drawing Sheets

TRAINING A DRIVER OF A VEHICLE TO ACHIEVE IMPROVED FUEL ECONOMY

BACKGROUND

The driving habits of automobile drivers play an important part in fuel consumption rates. Speeding, frequent or unnecessary acceleration changes, overuse of breaks, and erratic directional changes may decrease the overall fuel economy of the vehicle. Furthermore, different engines and vehicle styles respond differently to different driving styles. Some drivers may not be aware of the effects of driving behavior on vehicle fuel economy. Other drivers may be aware of the consequences of driving behavior but may find it hard to alter driving behavior. Still other drivers may engage in some beneficial driving behaviors but do not know how to optimize the fuel efficiency of a vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A system for training a driver to achieve improved fuel economy is disclosed. This system monitors the driving parameters of a vehicle, analyzes the monitored driving parameters, calculates suggested driving behavior adjustments, and communicates the driving behavior adjustments to the driver as the driver is driving.

DETAILED DESCRIPTION

A system for training a vehicle driver to achieve improved fuel economy is disclosed. The system monitors the driving behavior of the driver while the driver is operating the vehicle and suggests changes the driver can make in order to improve the fuel economy of the vehicle. In this manner, the driver is able to implement the suggested changes while continuing to operate the vehicle, thereby decreasing fuel usage, saving money, and lessening potentially harmful impacts the vehicle may have on the environment. As used herein, "fuel" is used to refer to all energy sources that power a vehicle, including liquid fuels, gaseous fuels, solid fuels, stored chemical energy that provides an electrical potential (e.g., in a battery or a fuel cell), and the like.

Figure 1:
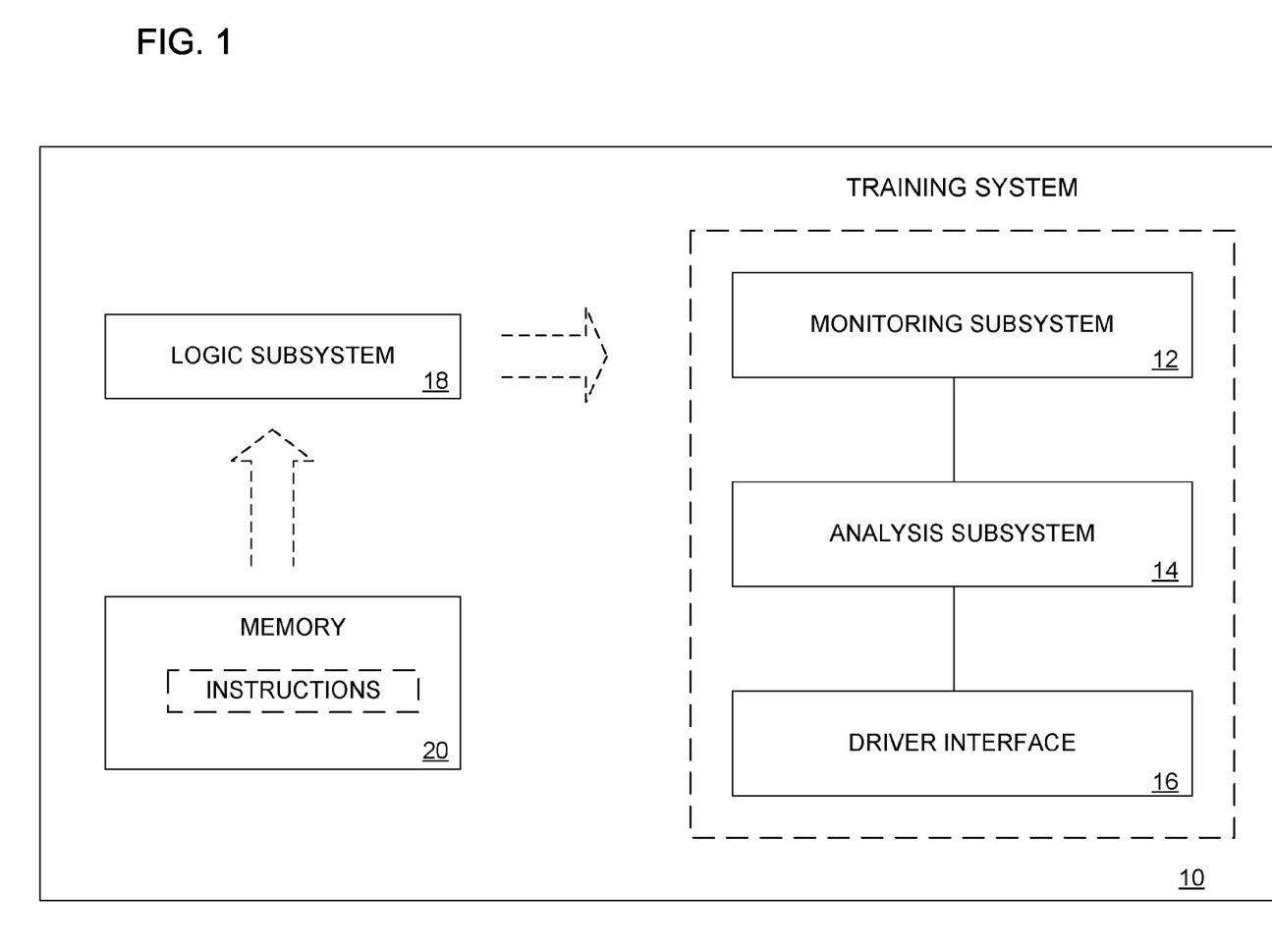
FIG. 1 schematically shows a system for training a driver of a vehicle to achieve improved fuel economy.

FIG. 1 somewhat schematically shows a non-limiting example of a training system 10 configured to help a driver achieve improved fuel economy. Training system 10 includes a monitoring subsystem 12, an analysis subsystem 14 communicatively coupled to the monitoring subsystem, and a driver interface 16 communicatively coupled to the analysis subsystem. As shown in FIG. 1, a training system may optionally include a logic subsystem 18 and/or memory 20. When included, logic subsystem 18 and/or memory 20 can serve as constituent elements of, or be used to enable, one or more of monitoring subsystem 12, analysis subsystem 14, and/or driver interface 16, or portions thereof.

Logic subsystem 18 may be configured to execute one or more instructions. For example, the logic subsystem may be configured to execute one or more instructions that are part of one or more programs, routines, objects, components, data structures, or other logical constructs. Such instructions may be implemented to perform a task, implement an abstract data type, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 20 may be a device configured to hold instructions that, when executed by the logic subsystem, cause the logic subsystem to implement the herein described methods and processes including, but not limited to, the monitoring, analyzing, and/or displaying methods associated with the herein disclosed monitoring subsystem, analysis subsystem, and/or driver interface. Memory 20 may include volatile portions and/or nonvolatile portions. In some embodiments, memory 20 may include two or more different devices that may cooperate with one another to hold instructions for execution by the logic subsystem. In some embodiments, logic subsystem 18 and memory 20 may be integrated into one or more common devices and/or computing systems.

Monitoring subsystem 12 may be configured to monitor one or more driving parameters of the vehicle. The one or more driving parameters of the vehicle may include, but are not limited to, speed, acceleration, current fuel consumption rate, current location, destination, route information, fuel level, fuel pressure, engine rotations-per-minute, engine load, engine run-time, engine coolant temperature, elevation, weather conditions, traffic data, grade of a road, engine type, vehicle make and model, etc. As such, the monitoring subsystem may include one or more sensors or other measurement devices configured to measure or otherwise acquire one or more parameters of interest.

As a non-limiting example, the monitoring subsystem may include a global positioning system (GPS) receiver. The GPS receiver may receive one or more signals from a system of satellites thereby allowing the GPS receiver to monitor various driving parameters of the vehicle, including current location, heading, elevation, speed, and acceleration. The one or more signals from the system of satellites may further be used to determine external driving parameters present at the vehicle's current location, including, but not limited to, elevation, traffic, weather conditions, and grade of the road. The GPS receiver may also include a user interface which may allow the driver to input a desired destination. In some embodiments, the user interface of the GPS receiver may be combined with driver interface 16, or shared with another interface of the vehicle.

As another non-limiting example, monitoring subsystem 12 may include an on-board diagnostic subsystem of the vehicle. The on-board diagnostic subsystem may be communicatively coupled to one or more sensors arrayed throughout the vehicle. The one or more sensors may monitor one or more driving parameters which may impact the performance of the vehicle, including, but not limited to, fuel level, fuel pressure, engine rotations-per-minute, engine load, engine run-time, mass-air-flow, oxygen levels, accessory load, and engine coolant temperature.

As a further non-limiting example, the monitoring subsystem may include adaptive cruise control radar. The adaptive cruise control radar may monitor the distance between the vehicle and one or more vehicles or other objects which may impact the vehicle's speed and acceleration.

Monitoring subsystem 12 may include one of the above examples, a combination of two or more of the above examples, and/or other monitoring device(s) which can monitor driving parameters which impact the fuel-economy of the vehicle. For example, in some embodiments, the monitoring subsystem may use only a GPS receiver or an on-board diagnostic subsystem for measuring the driving parameters, while in other embodiments the monitoring subsystem may use both a GPS receiver and an on-board diagnostic subsystem.

Analysis subsystem 14 may be configured to calculate one or more suggested driving adjustments. The analysis subsystem may calculate the one or more suggested driving behavior adjustments by applying one or more fuel-economy-improving principles to the one or more driving parameters monitored by the monitoring subsystem. The analysis subsystem may be part of a vehicle's on-board computing system, part of a GPS receiver, or another suitable device.

The fuel-economy-improving principles may be implemented using a variety of different strategies. Non-limiting examples of manners in which the fuel-economy-improving principles can be implemented include algorithms, heuristics, fuzzy logic, or other methods capable of arriving at decisions based on one or more input parameters (e.g., driving parameters).

A non-limiting example of a fuel-economy-improving principle includes increasing the coasting of the vehicle as the vehicle approaches a deceleration opportunity. The increase in coasting of the vehicle may provide improved fuel economy since the vehicle will not consume as much fuel when it is not under power. The analysis subsystem may calculate the best timing for the driver to release the throttle, dependent on vehicle speed, in order to reduce fuel consumption while maintaining vehicle inertia up to the deceleration opportunity. The deceleration opportunity may exist when the vehicle is approaching a turn, highway or freeway exit, stop sign, or downhill stretch in the road with excess speed that is likely to require energy-wasting braking. The analysis subsystem can be configured to recognize when such coasting opportunities exist (e.g., by comparing vehicle location and heading to current vehicle speed).

As further non-limiting examples, fuel-economy-improving principles may include maintaining even acceleration, reducing vehicle speed under high engine loads, keeping an engine rotations-per-minute to speed ratio below a desired threshold, avoiding vehicle routes with more anticipated starts and stops, and reducing vehicle accessory usage. The analysis subsystem can be configured to determine when the above described principles may be applied to reduce fuel consumption.

The fuel-economy-improving principles may include one of the above examples, a combination of the above examples, or other principles which may improve fuel economy of the vehicle when applied to the one or more driving parameters. The analysis subsystem may be updated through a wired or wireless computer connection to include more accurate and up-to-date fuel-economy-improving principles that produce more effective calculations.

Analysis subsystem 14 may also be configured to calculate suggested driving behavior adjustments responsive to a type of engine in the vehicle. The type of engine may include, but is not limited to, unleaded gasoline, diesel, electric, or a hybrid engine incorporating two or more different engine technologies. The type of engine may have different responses to different driving behavior adjustments. Therefore, the analysis subsystem may calculate suggested driving behavior adjustments based on the corresponding type of engine to improve fuel-economy of the vehicle.

The analysis subsystem may also calculate suggested driving behavior adjustments responsive to a make and model of the vehicle in which it is installed. The make and model of the vehicle may provide the analysis subsystem with one or more additional fuel-economy-effecting characteristics including, but not limited to, engine type, gross vehicle weight, and aerodynamic coefficient. The analysis subsystem may be able to provide more accurate suggested driving behavior adjustments based on more detailed information provided by the make and model of the vehicle.

The analysis subsystem may be selectably configured with a plurality of settings to calculate driving behavior adjustments responsive to the level of experience the driver has with the training system. 12. The analysis subsystem can vary levels of driving behavior adjustments suggested to a driver based on the selected settings as chosen by the driver, or as automatically determined by the training system based on a driver's past performance.

Figure 5:
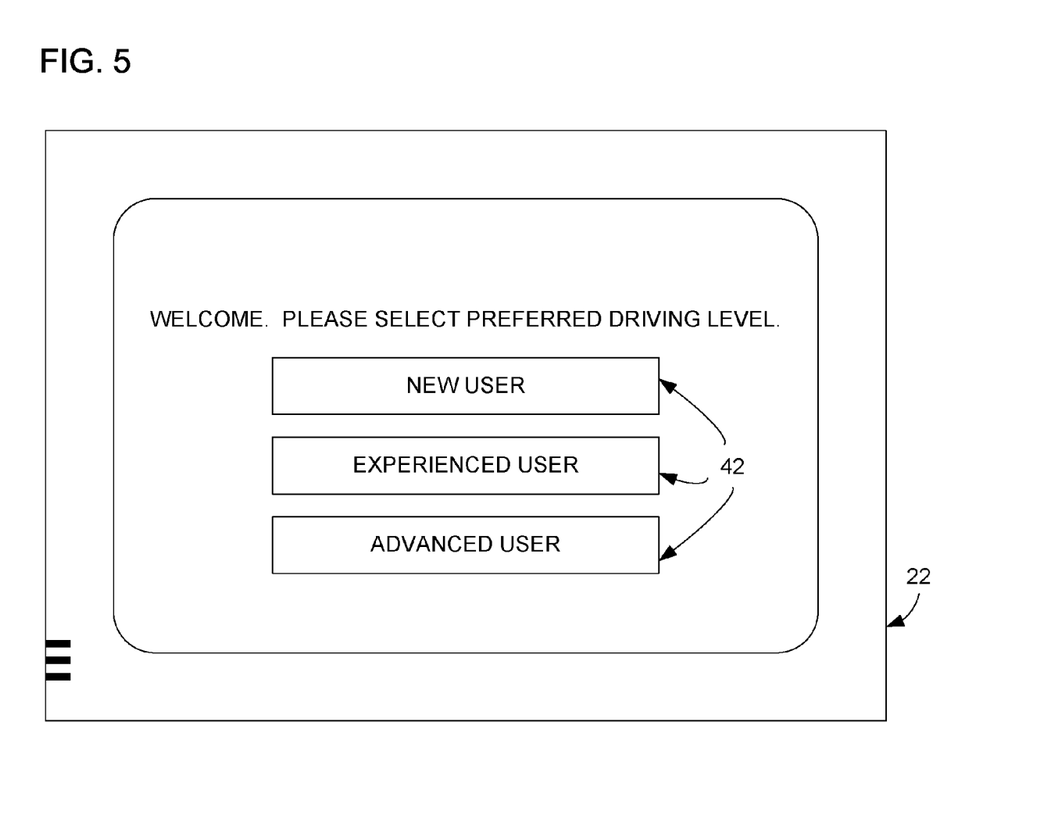
FIG. 5 shows the driver interface of FIG. 2 being used to allow a driver to select a preferred driving level.

As shown in FIG. 5, the driver may select a first level of suggested driving behavior adjustments when learning to use the training system. The driver may also select a second level of suggested driving behavior adjustments for normal driving conditions after the driver may be more familiar with the training system. Further, the driver may select a third level of suggested driving behavior adjustments when the driver wishes to optimize fuel-economy. Thus, the driver may be able to customize the analysis subsystem to calculate only the adjustments the driver is experienced enough to complete. The above customization scheme is provided as a non-limiting example, and others can be implemented without departing from the scope of the present disclosure. In some embodiments, selectable levels may correspond with a driver's experience level. In other embodiments, selectable levels may correspond with the aggressiveness with which the driver wishes the training system to make suggestions.

Additionally, the analysis subsystem may consider the current price of fuel when calculating suggested driving behavior adjustments. As a non-limiting example, the analysis subsystem may receive data from an Internet-connected GPS receiver, a radio receiver, a satellite receiver, a cellular receiver, another suitable device, or a combination of such devices. Such data may include the current location of the vehicle, nearby service stations, and the price of the fuel at those service stations. Thus, the analysis subsystem may calculate suggested driving behavior adjustments to optimize fuel-economy on days when prices may be higher and calculate less fuel-economy-improving suggested driving behavior adjustments when fuel prices are lower and other considerations, such as trip duration, are given a higher priority than fuel savings.

Analysis subsystem 14 may also calculate multiple fuel-economy-improving routes to a destination input by the driver (e.g., via driver interface 16). As non-limiting examples, the analysis subsystem may suggest a route which has fewer starts and stops, has more coasting opportunities, or avoids potential traffic issues. Further, driver interface 16 may communicate the most fuel-economy-improving routes to the driver and allow the driver to select the desired route.

Driver interface 16 may be configured to communicate the one or more suggested driving behavior adjustments calculated by analysis subsystem 14 to the driver. The driver interface may be located in the vehicle and may communicate the suggested driving behavior adjustments to the driver during vehicle operation. In this way, the driver may be able to learn which driving behaviors are desirable under various driving conditions and thus may be trained to achieve improved fuel economy before it is too late for such adjustments to have a real effect on fuel usage during a particular trip.

The driver interface may be configured to include a display to visually communicate suggested driving behavior adjustments to the driver. The display may include, but is not limited to, one or more liquid crystal displays (LCD), one or more light emitting diodes (LED), one or more touch-screen displays, and/or one or more light bulbs. The display may communicate to the driver with textual instructions, graphical instructions, colors corresponding to a driving behavior adjustment, range indicators that shows the maximally and minimally acceptable speed and acceleration together with current vehicle speed and acceleration, and/or other visual cues which may communicate to the driver that the driver should make a suggested driving behavior adjustment.

Figure 2:
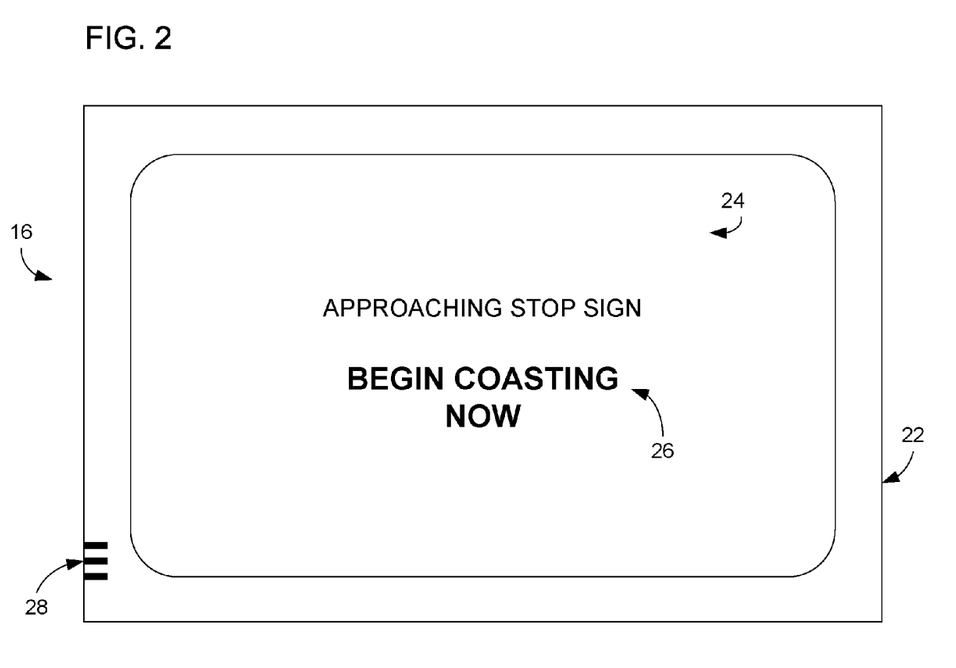
FIG. 2 shows an example driver interface compatible with the training system of FIG. 1.

FIG. 2 shows a non-limiting example of a display 22 including an LCD screen 24 which is communicating a suggested driving behavior adjustment 26 to the driver. LCD screen 24 may be positioned on a dashboard or at another location in a driver's field of vision. As illustrated, LCD screen 24 is informing the driver that a stop sign is approaching and that coasting could reduce fuel usage. As shown, the display may communicate the suggested driving behavior adjustments in short textual phrases as it may increase vehicle safety to reduce the amount of time the driver is reading the display.

As shown in FIG. 2, driver interface 16 may additionally or alternatively be configured to include a speaker 28 to auditorily communicate suggested driving behavior adjustments to the driver. The auditory communication may include verbal instructions or other discernable sounds that indicate suggested adjustments. Auditory instructions may increase vehicle operation safety by enabling the driver to receive suggested driving behavior adjustments without forcing the driver to look away from the road. Auditory instructions may also enable the training system to communicate more complicated instructions to the driver then may be possible with a visual display.

Figure 3:
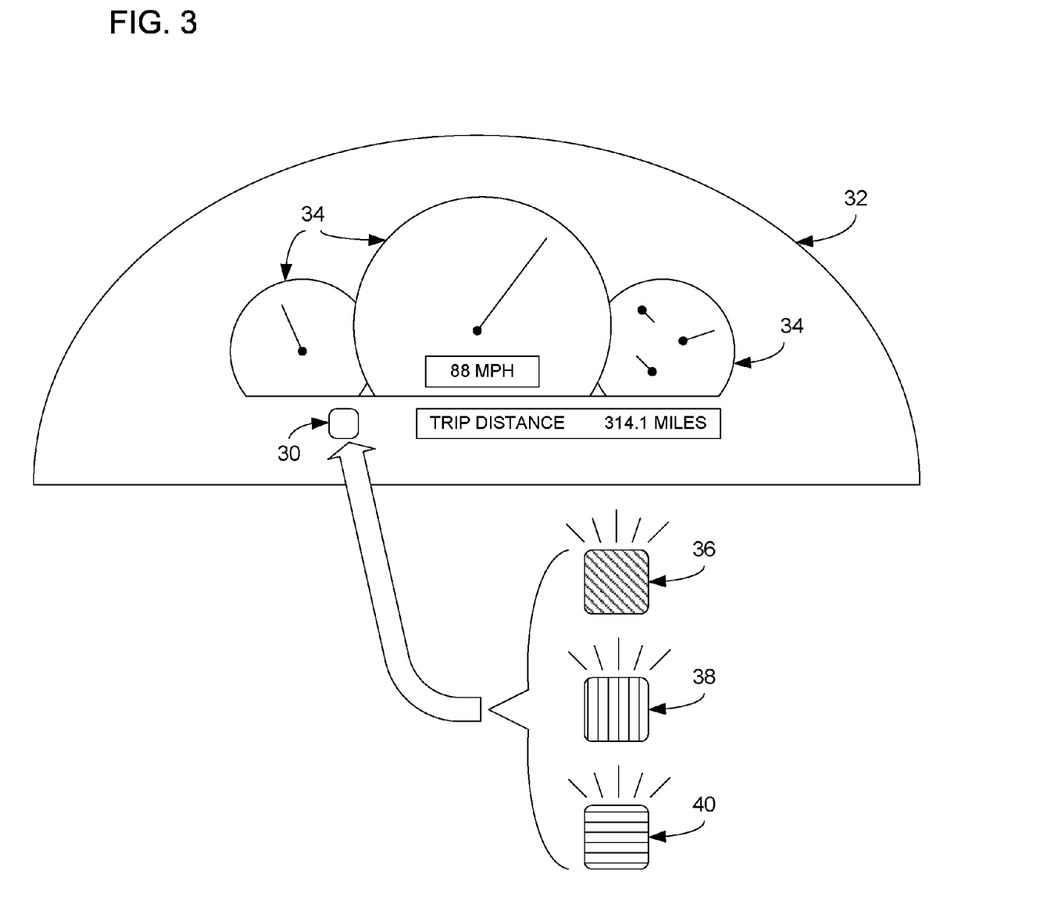
FIG. 3 shows another example driver interface compatible with the training system of FIG. 1.

FIG. 3 shows another non-limiting example of a display including a light 30, such as an LED, positioned in the driver's field of vision on an instruments panel 32 of the vehicle. The display may be configured to use a variety of colors to communicate to the driver the suggested driving behavior adjustments without forcing the driver to look away from the road for an extended period of time. The display may be located where the driver is accustomed to looking during vehicle operation, such as in close proximity to a vehicle gauge 34. In other embodiments, the display may be located on top of a dashboard, as part of a heads-up-display, or at another location in the driver's field of vision.

Figure 4:
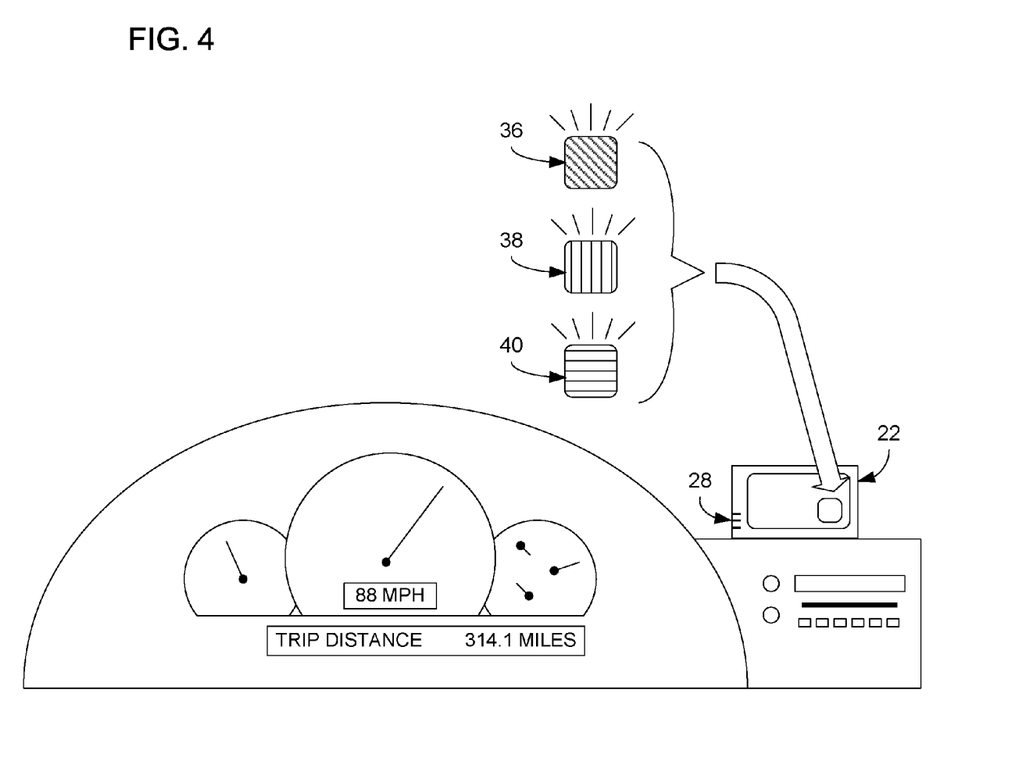
FIG. 4 shows another example driver interface compatible with the training system of FIG. 1.

As shown in FIG. 4, in some embodiments display 22, speaker 28, or other driver interface that communicates suggested driving behavior adjustments to the driver may be part of a peripheral device, such as a GPS receiver, third-party on-board computer, cellular telephone, or the like.

As shown in FIGS. 3 and 4, the display may be configured to display three colors: green (shown at 36 with diagonal lines), red (shown at 38 with vertical lines), and blue (shown at 40 with horizontal lines). Green may be used to communicate that no adjustment is currently needed. In other words, the analysis subsystem has determined that the driver need not make any adjustments in order to achieve better fuel economy. Red may be used to suggest that the driver make an adjustment to reduce throttle. Blue may be used to suggest the driver make an adjustment to coast the vehicle.

It is to be understood that green, red, and blue are provided as exemplary colors that can be used to communicate different information to a driver. In other embodiments, different colors, symbols, or other visual indicators may be used. Furthermore, while the above example uses three different colors to indicate three different states, it is to be understood that in other embodiments more or fewer states can be communicated using an appropriate number of visually discernable indicators (e.g., colors, shapes, etc.).

FIG. 5 shows a non-limiting example of display 22 being used to allow the driver to select a level of driver proficiency. The analysis subsystem may be configured to calculate driving behavior adjustments based on a proficiency selection 42 made by the driver. As a non-limiting example, the analysis subsystem and the driver interface may cooperate to provide advanced users with more aggressive driving behavior adjustments and provide new users with less aggressive and easier to follow driving behavior adjustments. As such, the analysis subsystem and the driver interface may be collectively configured to filter those suggested driving behavior adjustments which do not meet the level of proficiency selected. Thus, the driver may be able to customize the suggested driving behavior adjustments which are communicated by the driver interface.

Figure 6:
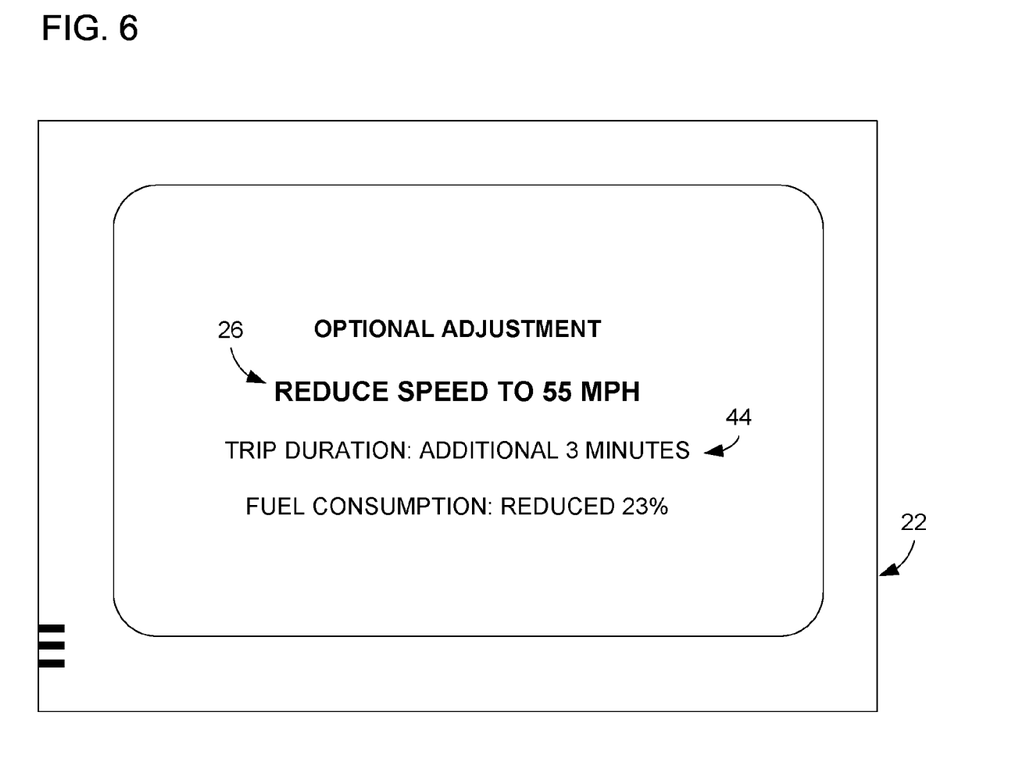
FIG. 6 shows the driver interface of FIG. 2 being used to communicate various optional driving behavior adjustments to the driver.

FIG. 6 shows a non-limiting example of display 22 which may be configured to communicate a suggested driving behavior adjustment 26 and an anticipated impact on trip duration 44 if the adjustment is undertaken by the driver. Thus, the driver may be able to determine the value of the improvement in fuel economy in relation to the extra travel duration.

Figure 7:
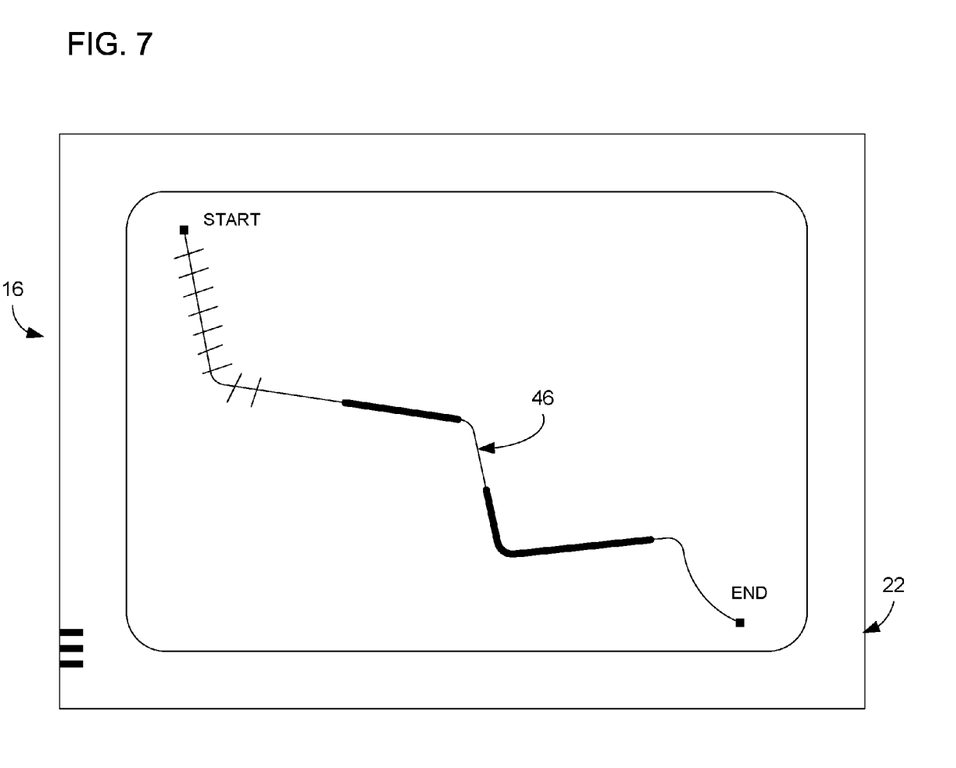
FIG. 7 shows the driver interface of FIG. 2 being used to show a vehicle-route map color-coded to correspond to various driving behavior adjustments suggested by the training system.

FIG. 7 shows a non-limiting example of driver interface 16 which may be configured to communicate a route 46 the vehicle is travelling which may be color-coded to match the suggested driving behavior adjustments previously communicated to the driver. The color-coded vehicle route may provide the driver with feedback as to which portions of the route the driver fulfilled the suggested driving behavior adjustments. Thus the driver may be able to learn to alter their driving behavior in the future in the same or similar driving locations. Further, the driver may learn to select a different vehicle route to a destination in the event they cannot complete the suggested driving behavior adjustments on a particular route. The color-coded route may also provide the driver with visual evidence of how accurately the driver is making the suggested driving behavior adjustments.

As further non-limiting examples, the driver interface may be configured to communicate to the driver when vehicle fuel level is too low to reach a desired destination, an acceptable range of vehicle speed and/or acceleration for certain driving parameters, the impact of external factors on fuel-economy, and alternative suggested driving behavior adjustments. The driver interface may be configured to communicate any driving parameters, suggested driving behavior adjustments, or other factors which may impact fuel-economy.

The driver interface may optionally be configured to communicate suggested driving behavior adjustments to the driver after vehicle operation has ceased. The driver may process the suggested driving behavior adjustments in more depth when not also operating the vehicle. Further, the driver may transfer the suggested driving behavior adjustments and related driving parameters to a computer. Thus the driver may be able to review past performance and track changes in driving behavior over time. The driver may also upload the suggested driving behavior adjustments and driving parameters to a remote computer. The remote computer may be accessed and/or reviewed by an authorized third party who may then use the information to make improvements to the fuel-economy-improving principles for future updating of the analysis subsystem.

Figure 8:
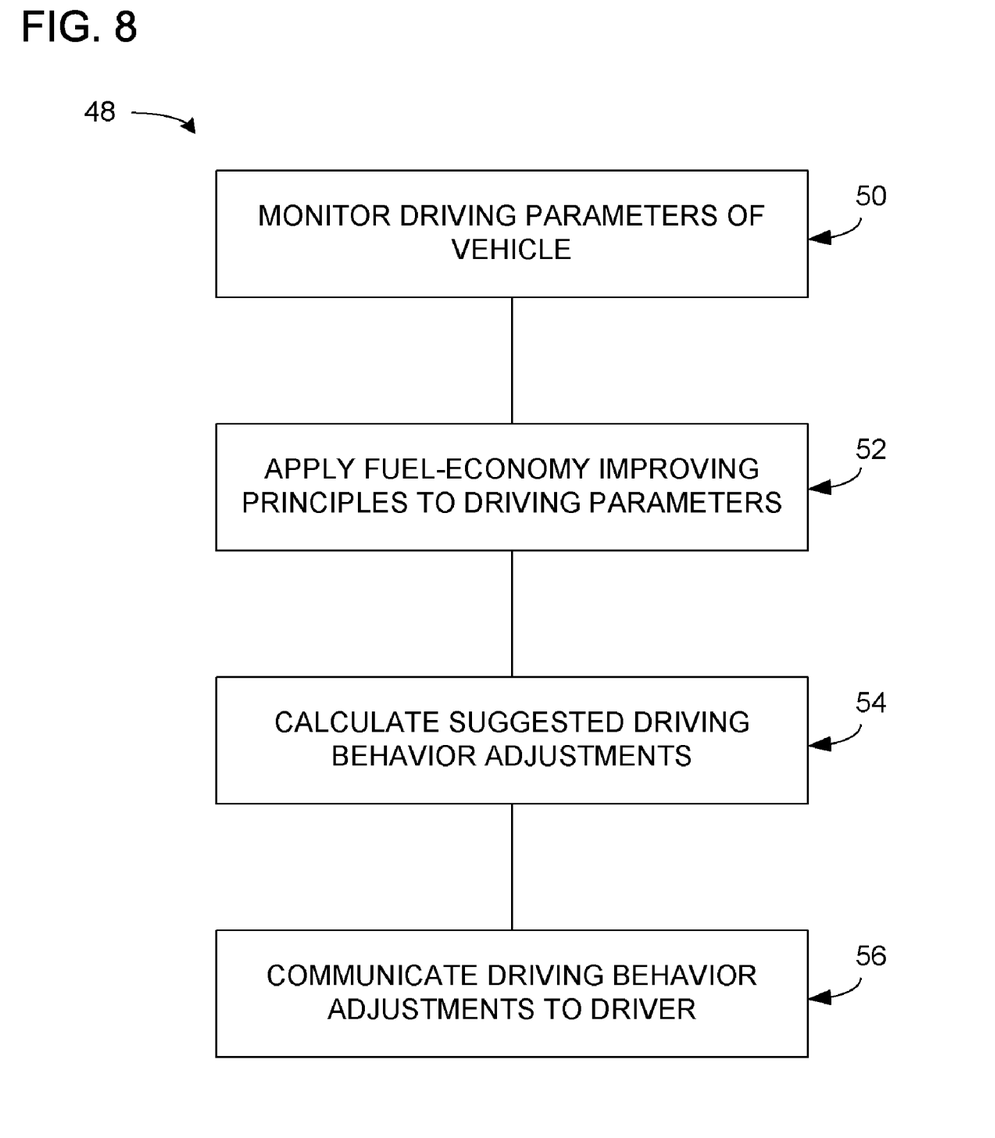
FIG. 8 shows a process flow of a method for training a driver of a vehicle to achieve improved fuel economy.

FIG. 8 shows a process flow of a method 48 for training a driver of a vehicle to achieve improved fuel economy. At 50, method 48 includes monitoring one or more driving parameters of the vehicle. At 52, method 48 includes applying one or more fuel-economy-improving principles to the driving parameters. At 54, method 48 includes calculating one or more suggested driving behavior adjustments. At 56, method 48 includes communicating driving behavior adjustments to the driver during vehicle operation. The fuel-economy-improving principles may be any variation as described above.

It should be understood that the configurations and/or approaches described herein are exemplary in nature, and that these specific embodiments or examples are not to be considered in a limiting sense, because numerous variations are possible. The specific routines or methods described herein may represent one or more of any number of training strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for training a driver of a vehicle to achieve improved fuel economy, comprising:
   a monitoring subsystem to monitor one or more driving parameters of the vehicle;
   an analysis subsystem communicatively coupled to the monitoring subsystem and configured to calculate one or more suggested driving behavior adjustments by applying one or more fuel-economy-improving principles to the one or more driving parameters; and
   a driver interface communicatively coupled to the analysis subsystem and located in the vehicle to communicate the one or more driving behavior adjustments to the driver during vehicle operation, the driver interface configured to selectively display a first color, a second color, or a third color to visually communicate the driving behavior adjustments to the driver, the first color indicating a throttle reduction, the second color indicating coasting, and the third color indicating no adjustment is needed.

2. The system of claim 1, where the monitoring subsystem includes a global positioning system receiver.

3. The system of claim 1, where the monitoring subsystem further includes an adaptive cruise control radar.

4. The system of claim 1, where the monitoring subsystem includes an on-board diagnostic subsystem of the vehicle.

5. The system of claim 1, where the one or more driving parameters of the vehicle include one or more of speed, acceleration, current location, destination, fuel level, fuel pressure, engine rotations-per-minute, engine load, engine run-time, engine coolant temperature, elevation, weather conditions, traffic data, and grade of a road.

6. The system of claim 1, where the driver interface includes a speaker to auditorily communicate driving behavior adjustments to the driver during vehicle operation.

7. The system of claim 6, where the driver interface auditorily communicates using verbal instructions.

8. The system of claim 1, where the analysis subsystem is selectably configured with a plurality of proficiency settings to alter levels of suggested driving behavior adjustments communicated to a driver by the driver interface.

9. The system of claim 1, where the driver interface communicates an impact on trip duration of a suggested driving behavior adjustment.

10. The system of claim 1, where the driver interface displays a route the vehicle traveled color coded to match suggested driving behavior adjustments provided to the driver throughout the route.

11. The system of claim 1, where the driver interface includes a light configured to selectively display the first color, the second color, or the third color.

12. The system of claim 1, where the first color is red, the second color is blue, and the third color is green.

13. A method for training a driver of a vehicle to achieve improved fuel economy, comprising:
   monitoring one or more driving parameters of the vehicle;
   calculating one or more suggested driving behavior adjustments by applying one or more fuel-economy-improving principles to the one or more driving parameters; and
   communicating the one or more driving behavior adjustments to the driver during vehicle operation by selectively displaying a first color, a second color, or a third color, the first color indicating a throttle reduction, the second color indicating coasting, and the third color indicating no adjustment is needed.

14. The method of claim 13, where communicating the one or more driving behavior adjustments to the driver during vehicle operation further comprises communicating an impact on trip duration of a suggested driving behavior adjustment.

15. The method of claim 13, where a light configured to selectively display the first color, the second color, or the third color communicates the one or more driving behavior adjustments to the driver during vehicle operation.

16. The method of claim 13, where the first color is red, the second color is blue, and the third color is green.

17. Computer readable memory comprising instructions, that when executed by a processing subsystem of a fuel-economy-training system, enable the fuel-economy-training system to instruct a driver to improve fuel economy of a vehicle by:
   monitoring one or more driving parameters of the vehicle;
   calculating one or more suggested driving behavior adjustments by applying one or more fuel-economy-improving principles to the one or more driving parameters; and
   communicating the one or more driving behavior adjustments to the driver during vehicle operation by selectively displaying a first color, a second color, or a third color, the first color indicating a throttle reduction, the second color indicating coasting, and the third color indicating no adjustment is needed.

18. The computer readable memory of claim 17, where communicating the one or more driving behavior adjustments to the driver during vehicle operation further comprises communicating an impact on trip duration of a suggested driving behavior adjustment.

19. The computer readable memory of claim 17, where a light configured to selectively display the first color, the second color, or the third color communicates the one or more driving behavior adjustments to the driver during vehicle operation.

20. The computer readable memory of claim 17, where the first color is red, the second color is blue, and the third color is green.

* * * * *